United States Patent [19]
Paul et al.

[11] Patent Number: 5,040,929
[45] Date of Patent: Aug. 20, 1991

[54] LOADING SYSTEM FOR PARTICULATE MATERIALS

[75] Inventors: Kermit D. Paul, Bethlehem; Robert E. Romanchik, Allentown, both of Pa.

[73] Assignee: Fuller Company, Lehigh Valley, Pa.

[21] Appl. No.: 444,067

[22] Filed: Nov. 30, 1989

[51] Int. Cl.5 .................. B65G 53/66; B65G 51/24
[52] U.S. Cl. .................................... 406/33; 406/3; 406/183; 406/156
[58] Field of Search .............. 406/156, 157, 163, 183, 406/3, 28, 33, 93, 169

[56] References Cited

U.S. PATENT DOCUMENTS

| | | | |
|---|---|---|---|
| 1,519,993 | 12/1924 | Koenig | 406/183 |
| 1,844,642 | 2/1932 | Dornbrook | 406/3 |
| 1,857,643 | 5/1932 | Kinyon | 406/3 |
| 2,714,533 | 8/1955 | Arquint | 406/169 |
| 2,918,330 | 12/1959 | Pfening | 406/156 |
| 3,224,812 | 12/1965 | Bozich | 406/3 |
| 4,543,017 | 9/1985 | Beck | 406/98 |
| 4,648,754 | 3/1987 | Stäheli et al. | 406/3 |
| 4,862,649 | 9/1989 | Davis et al. | 406/169 |

*Primary Examiner*—Joseph F. Peters, Jr.
*Assistant Examiner*—Virna Lissi Mojica
*Attorney, Agent, or Firm*—Daniel DeJoseph

[57] ABSTRACT

A loading system for light particulate materials. A storage hopper for granular material includes an airlock by which the material is fed into an air stream. The air and accompanying material are fed to a distribution pipe with multiple flexible downward projecting fill spouts which are spaced at regular intervals. Each spout has an associated control valve and air pressure sensor within the spout, so that as a container being loaded by the spout is filled, and the pressure in the spout increases beyond a preselected level, the spout is closed off and material automatically is transported to the next open spout. Air operated spreader heads may also be furnished at the lower ends of the spouts to assure that the container volumes are completely filled.

16 Claims, 2 Drawing Sheets

1

LOADING SYSTEM FOR PARTICULATE MATERIALS

BACKGROUND OF THE INVENTION

This invention deals generally with the distribution of particulate materials, e.g. granules and powders, and more specifically with a system for loading light particulate materials into several geometrically associated openings within one or more containers.

Loading of particulate material, which is alternatively referred to herein as granular material, into railcars or trucks is generally a slow process. Historically, plastic particulate material has been loaded into railroad cars and trucks by gravity. This requires elevating storage silos to allow for clearance for gravity flow, and the structural steel required can be quite extensive. Typically, it also requires that a worker atop a container on the vehicle place a spout within one of several hatches on the container and wait there until the volume of the container below the spout fills with material. Then flow to the spout is stopped, the spout is moved to an adjacent hatch and flow restarted. This process is repeated until the region below each spout is filled. Sometimes the vehicle is vibrated to assure that the spout it not merely producing a mound of material beneath each hatch, which would result in a large unused volume within the container.

Movement of the spout is either performed manually by the worker atop the vehicle, or the entire vehicle is moved and the worker will guide the spout to its final alignment. In either case, the prior art loading procedure is time consuming, and the worker is at considerable risk of an accident during the extended period of time he is atop the vehicle.

While there are several patented systems for filling multiple containers which use air streams to move light granular material, these existing systems depend upon specially designed containers and cannot be used with conventional vehicles.

For instance, U.S. Pat. No. 4,082,364 to Krambrock fills several containers in series in an air flow path, but each container is permanently piped into the air flow path and has a special internal structure. Similarly, U.S. Pat. No. 1,844,642 to Dornbrook uses specially constructed containers with internal sensors which initiate the operation of a valve within the piping to switch over from the filling of one container to another.

The present invention eliminates the requirement for special containers, and permits automatic filling of a single container with several hatches, or multiple containers located adjacent to each other, such as several hopper cars already coupled together. Moreover, this is accomplished with no reorientation of the filling spout or the vehicle itself.

To accomplish this, the present invention uses a distribution pipe with multiple fill spouts which can each be placed into a different loading hatch of one or more containers. Therefore, placement of spouts into hatches is required only once, at which time unused spouts are closed off with respect to the supply container by a diverter valve and operating spouts are opened. Subsequent to this initial set up, all control of the loading procedure is automatic.

The loading system of the preferred embodiment of the invention includes a supply container which is the source of the granular material to be loaded. This material source can be either a storage bin or a piece of processing equipment, such as a blender. The supply container feeds material into an airstream within a pipeline for delivery to the distribution pipe. Material is fed into the airstream through an airlock or some other conventional device to prevent loss of air pressure through the supply container.

The distribution pipe, which may be a rigid pipe, oriented approximately horizontally, with multiple flexible air tight fill spouts attached to it. Each fill spout extends vertically down from the distribution pipe and is selected to be long enough to extend into any container which is intended to be filled. Each fill spout is attached to the distribution pipe at a valve which can direct the air flow and, consequently, the material flow, either into the fill spout or into the downstream portion of the distribution pipe.

The valves are conventional power operated valves which simply switch the air flow to one or the other of two paths, but each is controlled by a pressure sensor located in its associated fill spout, near the input of the spout. It is the control of the valve by the pressure sensor which gives the preferred embodiment of the invention its automatic control feature.

In operation, when a valve is open to a particular fill spout, and therefore closed with respect to the remaining spouts downstream from the one which is open, the material being transferred is directed through the open spout into the container in which the spout had previously been placed. However, as the container becomes full, the material obstructs, initially very slightly, the fill spout which is the source of material, and the air pressure within the fill spout increases. It is this increase in pressure which, when it reaches a predetermined level, activates the pressure sensor within the fill spout and causes the valve at the input of the spout to change its position.

As the valve closes the fill spout associated therewith and opens the downstream section of the distribution pipe, the material flows past the now full container and proceeds to the next open fill spout, where it begins the loading procedure for that spout. The container for the new spout will then also be filled and automatically topped off before its associated valve will close its spout and continue the procedure to the next open fill spout.

To set up this action, that is, to program the procedure, it is only necessary for the operator to open the valve relative to each fill spout which will be utilized as that fill spout is being located within a container hatch. In a typical installation, there are multiple fill spouts, some of which will not be used, but regardless of whether a fill spout is at the end of the distribution pipe or between two open spouts, all that is required if it is not in use is that it be closed off by its valve. By "closed off", it is meant that the valve is placed in a "through" position whereby material will flow through the valve, into the downstream portion of the distribution pipe and into the next open fill spout, for which the valve associated therewith will be in the "divert" position. Once a fill spout is closed by its valve switching to the through position, the pressure sensor and power operation of the valve are disabled.

In normal operation, the distribution pipe is stored with all the fill spouts closed off by having the valves associated therewith placed in the through position, and the operator opens only those fill spouts, by placing the valves associated therewith in the "divert" position, which are put into use. Then each fill spout automatically closes as its container fills up and the filling of containers automatically progresses from the one nearest to the material source to the one most remote from the material source. When the loading is complete, all the valves may be placed in the through position to purge the system of excess material, and the system can be held for future use.

In an alternate embodiment of the invention, each fill spout has an associated air spreader head to distribute the material throughout the container which receives it. The spreader head is constructed with a central air supply pipe exit above a plate whose edges are curled upward to form a saucer. An inverted conical top is located above the pipe exit and covers all but the curled edges of the saucer, so that the lower edge of the cone and the saucer edge form an annular nozzle from which a stream of air acts upon the material falling down the slope of the cone. Two bolts are threaded through the saucer and support the cone so that the space between the cone and saucer edges is adjustable to control the air volume and velocity.

This addition to the loading system assures that the volume of each container is fully utilized, and its use will not hinder the pressure sensing or valve control features of the fill spouts.

The invention therefore furnishes an automatic loading system for multiple standard containers which, while assuring that each container is truly filled, nevertheless requires operator action only to initiate the filling process. Additionally, the use of structural stell necessary to complete the process can be reduced significantly. Moreover, since conventional hoisting machinery can be used to lift the distribution pipe and thus remove the closed spouts from their containers, the present invention requires no reorientation or movement of any fill spouts after the initial set up.

DETAILED DESCRIPTION OF THE INVENTION

Figure 1:
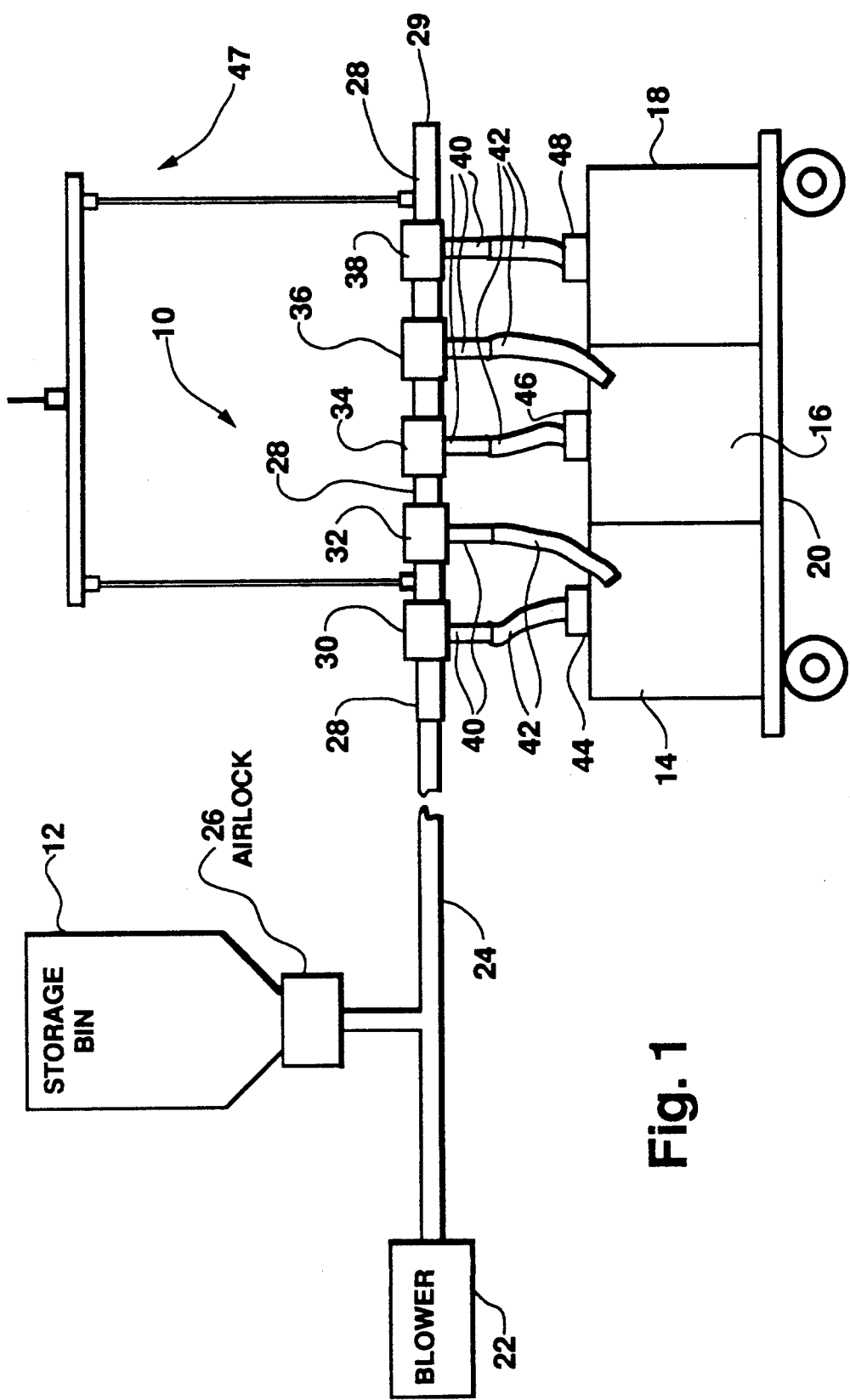
FIG. 1 is a simplified block diagram of the preferred embodiment of the invention.

The preferred embodiment is shown in FIG. 1 which is a simplified block diagram of the invention in which loading system 10 is used to load particulate material from storage bin 12 into containers 14, 16 and 18 which are on vehicle 20.

Loading system 10 uses blower 22 which creates an airstream in intermediate pipe 24 into which bin 12 feeds material through airlock 26. Airlock 26 is of conventional construction, for instance, with an air sealed cylinder with sealed compartments, so that it can feed material into intermediate pipe 24 while preventing air from escaping into bin 12. Intermediate pipe 24 then serves to transport the material which is carried by the airstream within intermediate pipe 24 to distribution pipe 28. It is understood that the passage of material from storage bin 12 into distribution pipe 28 can take place directly without use of intermediate pipe 24, depending upon the specific embodiment utlized. Moreover, such passage of material can be controlled manually or can be regulated automatically to shut off the passage of material into the airstream when the last container is filled according to the method of the present invention.

Distribution pipe 28 may be sealed at its far end 29, and contains at least one, and in the case of the preferred embodiment, several, valves 30, 32, 34, 36 and 38, while fill spouts 40 extend downward from each valve toward containers 14, 16 and 18 on vehicle 20. Each fill spout 40 has attached to its lower end a hollow flexible member 42. The lengths of flexible members 42 are selected to permit easy location of the lower ends into containers 14, 16 and 18 through hatches 44, 46 and 48. The lengths of flexible members 42 must also be chosen so that when flexible members 42 are placed within the hatches they can be located so that their ends are at a proper depth within the containers so that the material will fill the containers with no spillage. The proper lengths for flexible members 42 are well within the knowledge of those skilled in the art of handling bulk materials and filling containers.

Figure 2:
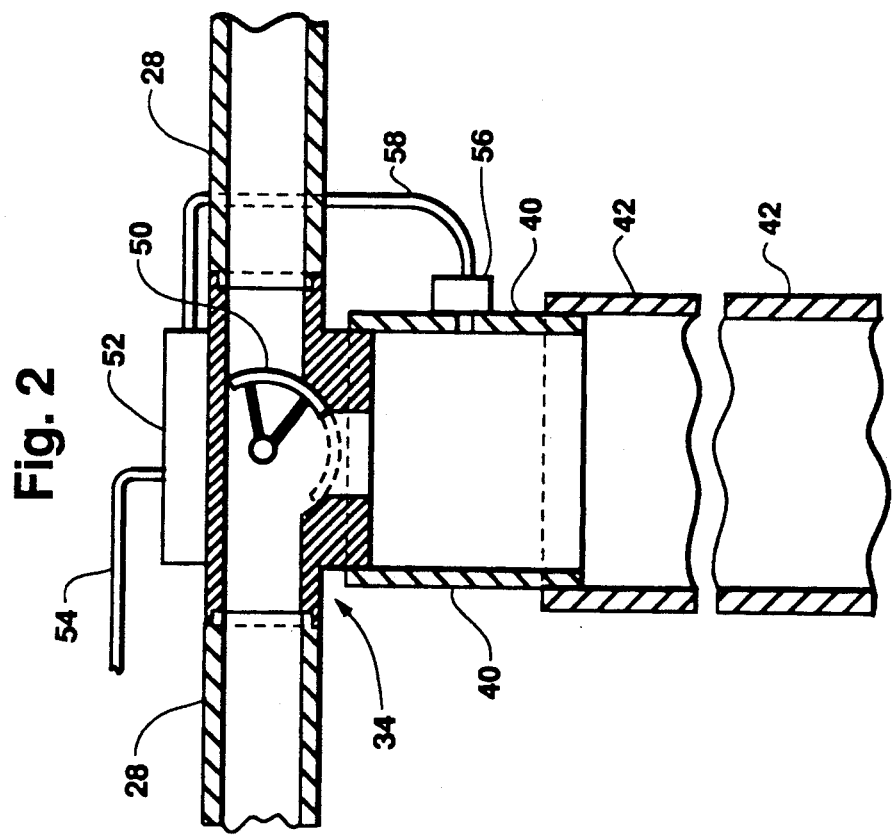
FIG. 2 is a cross section view of one fill spout and the associated valve of the preferred embodiment.

FIG. 2 is a cross section view of a typical construction of valves 30 through 38. The specific structure of the valves is not critical and is not considered a part of the present invention. Rather, it is the function of the valves within the invention which is vital to the present invention.

Valve 34 of FIG. 2 is typical of all the valves in loading system 10. It is located in distribution pipe 28 and is also connected to fill spout 40. The function of valve 34 is to either close off the air flow to the downstream portion of distribution pipe 28 or close off the air flow to fill spout 40, but not to block both at the same time during the period of time that the method of the present invention is in operation. Valve 34 is preferred to be of non-shut off design whereby when it is repositioning the closed port will open partially before the open port loses completely. In effect, valve 34 switches the air flow between the downstream portion of distribution pipe 28 and fill spout 40. To accomplish this, gate 50 of valve 34 is rotated by motor 52 from the "divert" position in which it is shown to the "through" position shown in dashed lines. Motor 52 is powered through line 54 from a source (not shown) which can be a common source of power for all the valves.

It should be appreciated that the valves can be operated from any conventional source such as electrical, hydraulic or pneumatic power. Moreover, the function of each valve could also be accomplished by the use of two independently operated devices, such as simple individual open and closed solenoid valves, which were properly interconnected to attain the same results.

Each of the valves is controlled in the same manner as is discussed here in regard to valve 34 of FIG. 2. The control of valve 34 is dependent upon the air pressure within fill spout 40, which is derived from air pressure sensor 56, which is interconnected with motor 52 by control line 58.

Valve 34 is operated so that motor 52 is inactivated whenever pressure sensor 56 is subjected to a pressure less than a preselected level, and motor 52 is activated to move gate 50 to close off fill spout 40 whenever the pressure within fill spout 40 is higher than the preselected level. Valve 34 is also capable of being set into the position pictured in FIG. 2, thus opening up fill spout 40, but it will not do so automatically in response to pressure sensor 56. Fill spout 40 may be opened, and distribution pipe 28 closed, only upon a specific control command or by manual operation of the valve. Thus, automatic operation occurs in only one direction, acting to close off fill spout 40, as a result, opening up the downstream portion of distribution pipe 28 to air flow, and, correspondingly, closing off the flow of material from storage bin 12. While FIG. 1 only depicts the loading of one vehicle 20, it is understood that the present invention can be easily adapted to load a number of vehicles in series.

OPERATION OF THE PREFERRED EMBODIMENT

Referring again to FIG. 1 for operation of the preferred embodiment, when valve 30 is open to permit passage of material to its fill spout, and its associated flexible member 42 has been placed, as shown, within hatch 44 of container 14, distribution pipe 28 is therefor closed to the remaining fill spouts connected to valves 32 through 38 downstream from the one which is open. When blower 22 is on and airlock 26 operating, the material being transferred is directed through valve 30 into the open fill spout and into container 14 into which flexible member 42 had previously been placed. However, as container 14 becomes full, when the material level reaches the bottom of fill spout 40, it causes an added resistance to flow for the conveying air thereby causing the air pressure within the fill spout to increase. It is this increase in pressure which affects pressure sensor 56 (FIG. 2) within fill spout 40 and causes motor 52 to change the condition of valve 30 so that fill spout 40 is closed, cutting off the material flow to container 14 just as it fills up.

As valve 30 closes its fill spout by switching from the divert position to the through position and thereby opens the downstream section of distribution pipe 28, the airstream and the material it carries flows past full container 14, and the material proceeds into the fill spout associated to valve 34, which was set in the divert position by the operator when its flexible member was located in container 16. There, the loading procedure for container 16 proceeds in the same manner as the previous operation in container 14. Container 16 will then also be filled and automatically topped off before its associated valve 34 moves from the divert position to the through position and thereby closes its fill spout to material flow and transfers the loading procedure to the next valve set in the divert position with an open fill spout.

To set up this action, that is, to program the procedure, it is only necessary for the operator to open the valve relative to fill spout which is put into use, as that fill spout is being located within a container hatch. As shown in FIG. 1, and as is true in most typical installations, there are multiple fill spouts, some of which will not be used, but regardless of whether a valve is at the end of the distribution pipe or between two open spouts as are valves 32 and 36, all that is required if a fill spout is not in use is that it be closed off by having the valve that is associated therewith be placed in the through position. Once a fill spout is closed to material flow by its valve, either automatically or during initial set up, the pressure sensor and the motor of the valve are disabled, since they only operate it in one direction, that is, to close the fill spout and open material flow to the distribution pipe downstream of the valve.

The distribution pipe may be stored with all the fill spouts closed off, with the operator opening only those fill spouts whose flexible members are inserted into a container. Each open fill spout is then automatically closed by its valve as its container fills up. The filing of containers automatically progresses from the one nearest to the storage bin to the one most remote from the storage bin. As the last container is filled, the loading stops and therefore air flow ceases.

When the loading is complete, the fill spouts may be once more all closed, and the system can be held for future use. Distribution pipe 28 and flexible members 42 can be adopted to lifted up such as by means of optioning lifting rig 47, which can also be used to lower them in order to load the next set of containers.

Figure 3:
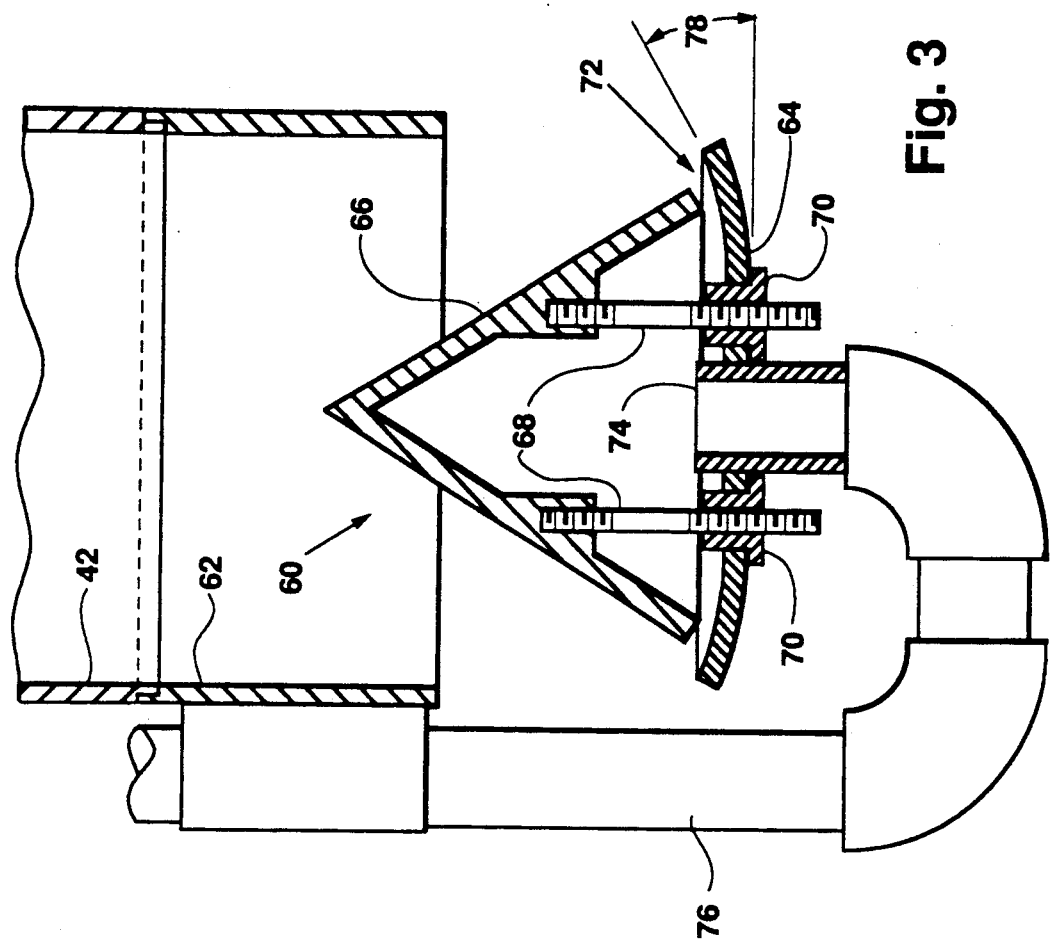
FIG. 3 is a cross section view of the spreader head of the invention.

FIG. 3 is a cross section drawing of a spreader head which is used in an alternate embodiment of the invention to better assure complete filing of the containers into which material is being loaded. Spreader head 60 is placed at the lower end of flexible member 42 by attaching nozzle 62 to flexible member 42.

Spreader head 60 is essentially constructed of saucer shaped diverter base 64 and cover 66 which is constructed as an inverted cone. Cover 66 is held above base 64 by bolts 68, which are threaded through rotatable fittings 70 in base 64 and are attached to the underside of cover 66. This configuration permits annular gap 72, the space between the edge of cover 66 and base 64, to be adjusted by rotating fittings 70. Air is supplied to spreader head 60 by air pipe 74 which penetrates through the center of base 64 and is fed air by air line 76 which follows approximately the same path as flexible member 42.

Base 64 is constructed with its outer edge curved upward and is dimensioned so that its circumference is larger than the largest circumference of cover 66. This configuration results in gap 72 being inboard from the edge of base 64, so that granular material falling down along the outside of cover 66 will be diverted by the airstream coming out of gap 72. Moreover, the diameter of base 64 is also approximately the same as the inside diameter of nozzle 62, so that even the falling material which does not actually contact cover 66 is diverted sideways by the airstream.

Base 64 has an angle 78 which is determined by the relationship of the top surface of the edge of base 64 to a horizontal plane. It has been determined by experimentation that spreader head 60 operates most satisfactorily when angle 78 is in the range of about 30 to about 45 degrees. This range yields maximum spread of material for any given air flow and size of gap 72.

The required air flow through air pipe 74 has been determined to be generally proportional to the filling rate of the material being supplied to nozzle 62, and the size of gap 72 is best determined experimentally for each application by adjusting it to yield maximum deflection for the material being supplied.

It should be apparent that the addition of spreader head 60 to the loading system depicted in FIG. 1 has no effect on the pressure sensing of the loading, and therefore loading system 10 will operate in the same manner whether or not spreader head 60 is installed, except, of course, for the ability of spreader head 60 to improve the ability to completely fill a container.

The present invention therefore furnishes a loading system which is essentially completely automatic, since it requires only simple initial set up, after which all actions are performed without operator involvement.

It is to be understood that the form of this invention as shown is merely a preferred embodiment. Various changes may be made in the function an arrangement of parts; equivalent means may be substituted for those illustrated and described; and certain features may be used independently from others without departing from the spirit and scope of the invention as defined in the following claims.

For example, more or fewer valves may be installed on distribution pipe 28. Moreover, additional distribution pipes can be added before or after the single one shown in order to use the invention to load multiple vehicles, with each vehicle having multiple containers.

It should also be apparent that other spreader means can be used in conjunction with the fill spouts in accordance with the loading system of the present invention, and applicants therefore are not to be limited to any one specific embodiment.

What is claimed is:

1. A loading system for particulate solids comprising:
   air supply means in connection with and furnishing an airstream to a distribution pipe;
   material supply means containing solid particulate material;
   airlock means located intermediate the material supply means and the distribution pipe so that said airlock means receives particulate material from said material supply means and furnishes the particulate material to the distribution pipe while preventing air from the distribution pipe from escaping into the material supply means; whereby there are at least two fill spouts attached to the distribution pipe, each fill spout extending downward from the distribution pipe,
   a hollow flexible member attached to each fill spout at the end remote from the distribution pipe, with the flexible member being of sufficient length to be placed in a container to be filled and for its lower end to be in contact with the material in the container before the material overflows from the container;
   valve means with associated valve actuating means, with a valve means interconnected with each fill spout and also with the distribution pipe at each fill spout, each valve means operating to close, relative to the airstream, either the fill spout or the portion of the distribution pipe downstream from the fill spout with which it is associated; and
   pressure sensing means located within each fill spout and controlling the valve actuating means so that, when the pressure sensing means is subjected to a pressure exceeding a preselected value, the valve actuating means changes the condition of the valve means from a condition which closes the distribution pipe to the airstream to one which closes the fill spout to the airstream.

2. The loading system of claim 1 further including a spreader head attached to the lower end of the hollow flexible member, the spreader head comprising:
   a base constructed of a circular plate with its edge curved upward;
   a cover constructed as an inverted cone, with the inverted cone located above the base, with the lower edge of the cone approaching the base and the lower edge of the cone having a diameter less than the diameter of the base;
   an air supply means attached to the base and to the flexible member with the air supply means furnishing pressurized air to the volume enclosed by the base and the cover; and
   support means attached to the base and the flexible member and supporting the base in a location approximately centered with and just below the flexible member to which the support means is connected.

3. The loading system of claim 2 wherein the inverted cone is held in place by at least two supports which are attached to the base and to the inside of the cone.

4. The loading system of claim 3 wherein the supports are threaded through rotatable fixtures attached to the base so that rotation of the rotatable fixtures adjusts the height of the edge of the cover above the base.

5. The loading system of claim 2 wherein the diameter of the base is approximately the same as the inside diameter of the flexible member.

6. The loading system of claim 2 wherein the circular plate edge is curved upward so that its top surface forms an angle with a horizontal plane, the angle being in a range between about 30 and about 45 degrees.

7. The loading system of claim 2 wherein the air supply means is a pipe which penetrates the base at the center of the base.

8. The loading system of claim 2 wherein the air supply means includes the support means which is a nozzle attached to the lower end of the flexible member and a rigid pipe which connects the base to the nozzle.

9. The loading system of claim 8 wherein the air supply means includes the support means which is a nozzle attached to the lower end of the hollow member and a rigid pipe which connects the base to the nozzle.

10. A loading system for particulate materials including a spreader head attached to the lower end of a hollow member through which material flows into a container, the spreader head comprising:
    a base constructed of a circular plate with its edge curved upward;
    a cover constructed as a inverted cone, with the inverted cone located above the base and held in place by at least two supports which are attached to the base and to the inside of the cone, with the lower edge of the cone approaching the base and the lower edge of the cone having a diameter less than the diameter of the base;
    an air supply means attached to the base and to the hollow member with the air supply means furnishing pressurized air to the volume enclosed by the base and the cover; and
    support means attached to the base and the hollow member and supporting the base in a location approximately centered with and just below the hollow member to which the support means is connected.

11. The loading system of claim 10 wherein the supports are threaded through rotatable fixtures attached to the base so that rotation of the rotatable fixtures adjusts the height of the edge of the cover above the base.

12. The loading system of claim 10 wherein the diameter of the base is approximately the same as the inside diameter of the hollow member.

13. The loading system of claim 10 wherein the circular plate edge is curved upward so that its top surface forms an angle with a horizontal plane, the angle being in a range from 30 and 45 degrees.

14. The loading system of claim 10 wherein the air supply means is a pipe which penetrates the base at the center of the base.

15. A loading system for particulate solids comprising:
    air supply means in connetion with and furnishing an airstream to an intermediate pipe;

material supply means containing solid particulate material;

airlock means located intermediate the material supply means and the intermediate pipe so that said airlock means receives particulate material from said material supply means and furnishes the particulate material to the intermediate pipe while preventing air from the intermediate pipe from escaping into the material supply means;

a distribution pipe in connection with the intermediate pipe, with at least two fill spouts attached to the distribution pipe, each fill spout extending downward from the distribution pipe, a hollow flexible member attached to each fill spout at the end remote from the distribution pipe, with the flexible member being of sufficient length to be placed in a container to be filled and for its lower end to be in contact with the material in the container before the material overflows from the container;

valve means with associated valve actuating means, with a valve means interconnected with each fill spout and also with the distribution pipe at each fill spout, each valve means operating to close, relative to the airstream, either the fill spout or the portion of the distribution pipe downstream from the fill spout with which it is associated; and pressure sensing means located within each fill spout and controlling the valve actuating means so that, when the pressure sensing means is subjected to a pressure exceeding a preselected value, the valve actuating means changes the condition of the valve means from a condition which closes the distribution pipe to the airstream to one which closes the fill spout to the airstream.

16. A loading system for particulate material comprising:

air supply means in connection with and furnishing an airstream and solid particulate material carried by the airstream to a distribution pipe;

a distribution pipe with at least one fill spout attached to the distribution pipe, each fill spout extending downward from the distribution pipe;

a hollow member attached to each fill spout at the end remote from the distribution pipe, with the hollow member being of sufficient length to be placed in a container to be filled and for its lower end to be in contact with the material in the container before the material overflows from the container;

valve means with associated valve actuating means, with a valve means interconnected with each fill spout and also with the distribution pipe at each fill spout, each valve means operating to close either the fill spout or the portion of the distribution pipe downstream from the fill spout with which it is associated; and pressure sensing means located within each fill spout and controlling the valve actuating means so that, when the pressure sensing means is subjected to a pressure exceeding a preselected valve, the valve actuating means changes the condition of the valve means from a condition which closes the distribution pipe to one which closes the fill spout.

* * * * *